U. C. OBLOSSER.
CULINARY IMPLEMENT.
APPLICATION FILED OCT. 19, 1909.
968,968.
Patented Aug. 30, 1910.
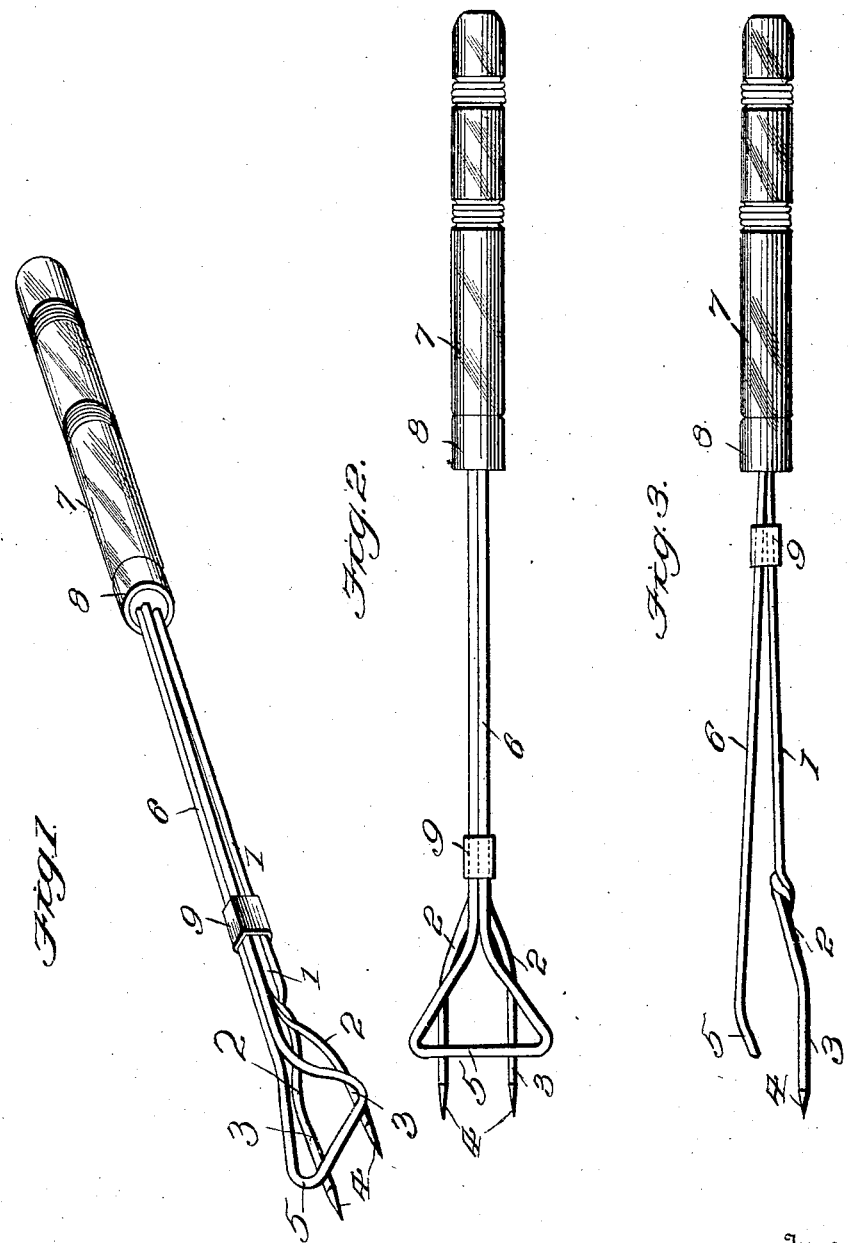

UNITED STATES PATENT OFFICE.

ULYSSES C. OBLOSSER, OF BLOOMSBURG, PENNSYLVANIA.

CULINARY IMPLEMENT.

968,968.

Specification of Letters Patent. Patented Aug. 30, 1910.

Application filed October 19, 1909. Serial No. 523,525.

*To all whom it may concern:*

Be it known that I, ULYSSES C. OBLOSSER, a citizen of the United States, residing at Bloomsburg, in the county of Columbia and State of Pennsylvania, have invented certain new and useful Improvements in Culinary Implements, of which the following is a specification.

This invention comprehends certain new and useful improvements in culinary implements and has for its primary object a sanitary device for holding a pork greaser for the purpose of greasing griddles, pans and the like.

With this and other objects in view as will more fully appear as the description proceeds, the invention consists essentially in an improved construction of pork greaser having curved tines with sharp extremities so as to readily penetrate the pork greaser, and in combination therewith, a clamp preferably of the same material as the tines, and made with a substantially triangular bend which is preferably of a width equal to, or more than the distance between the two tines, an oblong ferrule being mounted on the two members of the clamp and fork and so arranged that when drawn down it will securely hold the pork greaser in place.

The invention also consists in certain constructions, arrangements and combinations of the parts that I shall hereinafter fully describe and claim.

For a full understanding of the invention reference is to be had to the following description and accompanying drawings, in which:—

Figure 1 is a perspective view of my improved pork greaser holder. Fig. 2 is a top plan view thereof, and Fig. 3 is a side view.

Corresponding and like parts are referred to in the following description and indicated in all the views of the accompanying drawing, by the same reference characters.

In the present embodiment of my invention the fork of the device is constructed of suitably strong wire members 1 that are arranged parallel and in contact with each other throughout the major portion of their length, the same being then twisted one or more times one about the other and thence diverged as indicated at 2, the ends being bent so as to assume a parallel relation as indicated at 3, and having sharp points or extremities 4 whereby the fork may readily penetrate the pork greaser.

In connection with the fork a clamp is employed. This clamp in the present instance is constructed of a strip of wire of the requisite length which is doubled upon itself at an intermediate point to form a triangular head 5 designed to coact with the tines of the fork, as clearly illustrated in the drawing so as to securely hold the pork greaser between them.

The ends of the shank portion 6 of the clamp, as well as the ends of the members 1, are embedded in a handle 7 which is preferably made of wood with black enamel finish, having a heavy nickel or similar ferrule 8, so that it cannot absorb the grease, thereby producing a very sanitary and useful article.

Mounted on the members 1 and shank 6 is a slidable thimble or sleeve 9 which is oblong and polygonal in cross-section as shown, and which, when drawn down toward the head of the clamp and the tines of the fork, will bind the same securely down upon the pork greaser and hold the latter securely in place.

Manifestly the device can be cheaply manufactured and the parts easily assembled.

Having thus described the invention what is claimed as new is:—

As a new article of manufacture, a pork greaser holder embodying a fork and a clamp coacting therewith, the clamp being constructed of a single strip of wire bent intermediate of its ends into substantially triangular shape to form a head of a width greater than the distance between the tines of the fork, the two end portions of the wire being extended parallel to each other, and a handle in which the extremities of such ends are embedded, the fork being also secured to said handle, and a thimble slidable on the clamp and fork and adapted to bind the same together.

In testimony whereof I affix my signature in presence of two witnesses.

ULYSSES C. OBLOSSER. [L. S.]

Witnesses:
HARRY R. WILLIAMS,
C. C. PEACOCK.